US010994216B2

(12) United States Patent
Board

(10) Patent No.: US 10,994,216 B2
(45) Date of Patent: May 4, 2021

(54) VIRTUAL REALITY MOTION SIMULATOR

(71) Applicant: Board Media Group LLC, Snohomish, WA (US)

(72) Inventor: David Board, Snohomish, WA (US)

(73) Assignee: Board Media Group LLC, Snohomish, WA (US)

( * ) Notice: Subject to any disclaimer, the term of this patent is extended or adjusted under 35 U.S.C. 154(b) by 0 days.

(21) Appl. No.: 16/992,226

(22) Filed: Aug. 13, 2020

(65) Prior Publication Data

US 2021/0046391 A1 Feb. 18, 2021

Related U.S. Application Data

(60) Provisional application No. 62/887,179, filed on Aug. 15, 2019.

(51) Int. Cl.
*A63G 31/16* (2006.01)
*A63F 13/53* (2014.01)
(Continued)

(52) U.S. Cl.
CPC .............. *A63G 31/16* (2013.01); *A63F 13/53* (2014.09); *A63F 13/57* (2014.09); *A63F 13/65* (2014.09);
(Continued)

(58) Field of Classification Search
CPC .......... A63F 13/53; A63F 13/57; A63F 13/65; A63F 13/803; A63F 2300/8082;
(Continued)

(56) References Cited

U.S. PATENT DOCUMENTS 5,195,746 A    3/1993 Boyd et al.
5,240,417 A *  8/1993 Smithson ......... A63B 21/00181
                                              434/61
(Continued)

FOREIGN PATENT DOCUMENTS

RU    2662399 C1    7/2018

OTHER PUBLICATIONS

Doolan, "Weirdness: The Hot Seat Allowed You to Play NES Games With Motion Control <https://www.nintendolife.com/news/2019/04/weirdness_the_hot_seat_allowed_you_to_play_nes_games_with_motion_control>" <https://www.nintendolife.com/news/2019/04/weirdness_the_hot_seat_allowed_you_to_play_nes_games_with_motion_control>, Apr. 24, 2019.

(Continued)

*Primary Examiner* — William H McCulloch, Jr.
(74) *Attorney, Agent, or Firm* — Banner & Witcoff, Ltd.

(57) ABSTRACT

Methods and systems for simulating motion in a virtual reality system without external motors or similar machinery are described herein. A mechanical seat may be mounted to a base such that the seat is moveable in at least two dimensions (e.g., roll and pitch). A human occupant of the seat may use a control yoke fixed in relation to the base to cause the chair to move in a direction opposite of the force exerted on the control yoke. An extended reality (XR) motion controller may be mounted in a fixed relationship to the seat. Motion may then be simulated in an XR environment by depicting acceleration that would yield a similar experience on the user's vestibular senses as gravity exerts on the user's vestibular senses based on motion of the seat.

6 Claims, 6 Drawing Sheets

(51) Int. Cl.
    *A63F 13/57*     (2014.01)
    *A63F 13/65*     (2014.01)
    *G02B 27/01*     (2006.01)
    *A63F 13/803*     (2014.01)

(52) U.S. Cl.
    CPC ........ *A63F 13/803* (2014.09); *G02B 27/0172* (2013.01); *G02B 27/0179* (2013.01); *A63F 2300/8082* (2013.01); *G02B 2027/0183* (2013.01)

(58) Field of Classification Search
    CPC ........ G02B 2027/0183; G02B 27/0172; G02B 27/0179; A63G 31/16
    See application file for complete search history.

(56) References Cited

U.S. PATENT DOCUMENTS

| | | | | |
|---|---|---|---|---|
| 5,364,271 | A * | 11/1994 | Aknin | A63B 21/00181 434/61 |
| 5,782,639 | A * | 7/1998 | Beal | A63B 71/0622 434/29 |
| 8,298,845 | B2 * | 10/2012 | Childress | A63F 13/803 438/47 |
| 9,990,689 | B2 * | 6/2018 | Lashkari | G06T 19/006 |
| 10,073,263 | B2 * | 9/2018 | Katz | G02B 27/017 |
| 10,269,089 | B2 * | 4/2019 | Lashkari | G02B 27/0093 |
| 2004/0176166 | A1 * | 9/2004 | Siegel | A63F 13/06 463/37 |
| 2009/0163283 | A1 * | 6/2009 | Childress | A63F 13/28 463/47 |
| 2016/0320862 | A1 * | 11/2016 | Schradin | G06F 3/011 |
| 2017/0178272 | A1 * | 6/2017 | Lashkari | G06T 19/006 |
| 2017/0348594 | A1 * | 12/2017 | Lazar | G06F 3/011 |
| 2019/0121425 | A1 * | 4/2019 | Lee | A47C 9/025 |
| 2020/0098185 | A1 * | 3/2020 | Schradin | G09B 9/003 |
| 2020/0360204 | A1 * | 11/2020 | Stajic | A47C 9/025 |

OTHER PUBLICATIONS

Totilo, "This Nintendo Chair Would Have Improved My Childhood" <https://kotaku.com/this-nintendo-chair-would-have-improved-my-childhood-5674652>, Oct. 27, 2010.
5D Realities—Compatible Simulators—https://5drealities.com/Simulators.aspx, accessed Aug. 2020.
Icaros <https://www.icaros.com/>, accessed Aug. 2020.
Virtual Reality Motion Simulator <https://www.yawvr.com/>, accessed Aug. 2020.
https://www.feelthree.com/, accessed Aug. 2020.
Vive Tracker <https://www.vive.com/us/accessory/vive-tracker/>, accessed Aug. 2020.
XSimulator—DIY Motion Simulation, Motion Cancellation with the Vive and Vive Tracker—a Tracker Mount, <https://www.xsimulator.net/community/threads/motion-cancellation-with-the-vive-and-vive-tracker-a-tracker-mount.10346/>, accessed Aug. 2020.
<https://github.com/matzman666/OpenVR-InputEmulator>, accessed Aug. 2020.
"How to setup Yaw VR Motion compensation on Steam" https://www.yawvr.com/post/how-to-setup-yaw-vr-motion-compensation-on-steam, accessed Aug. 2020.
"Motion Cancellation" <https://simrig.se/articles/motion-cancellation-openvr-ie/>, Oct. 10, 2019.
Nov. 6, 2020—WO International Search Report and Written Opinion for PCT/US2020/046307—App PCT/US2020/046307.
Anonymous, "Head-mounted display—Wikipedia," Jun. 10, 2018, retrieved from the Internet on Nov. 6, 2020, at <https://en.wikipedia.org/w/index.php?title=Head-mounted display&oldid=845236924>, 8 pages.
Beckaus, et al., "ChairI0—The Chair Based Interface," Dec. 31, 2007, retrieved on Mar. 3, 2017, at <https://pdfs.semanticscholar.org/16af/753e94919ca257957cee7ab6c1b30407bb91.pdf>, 18 pages.
Probst, et al., "A chair as ubiquitous input device," Proceedings of the Sigchi Conference on Human FActors in Computing Systems, ACM, Apr. 26, 2014, pp. 4097-4106.

* cited by examiner

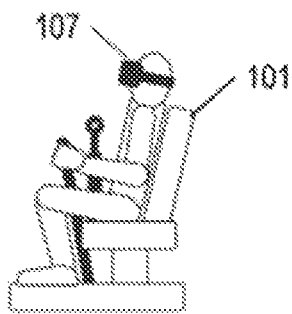
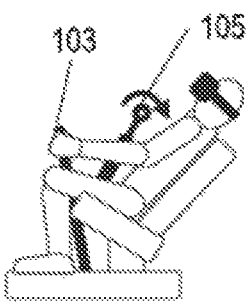
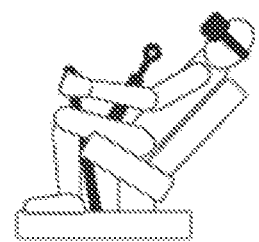
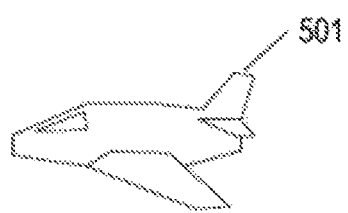
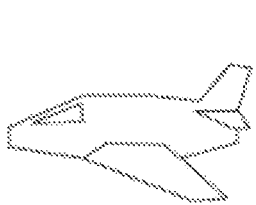
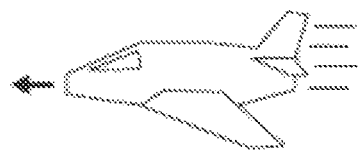
Fig. 5A           Fig. 5B           Fig. 5C
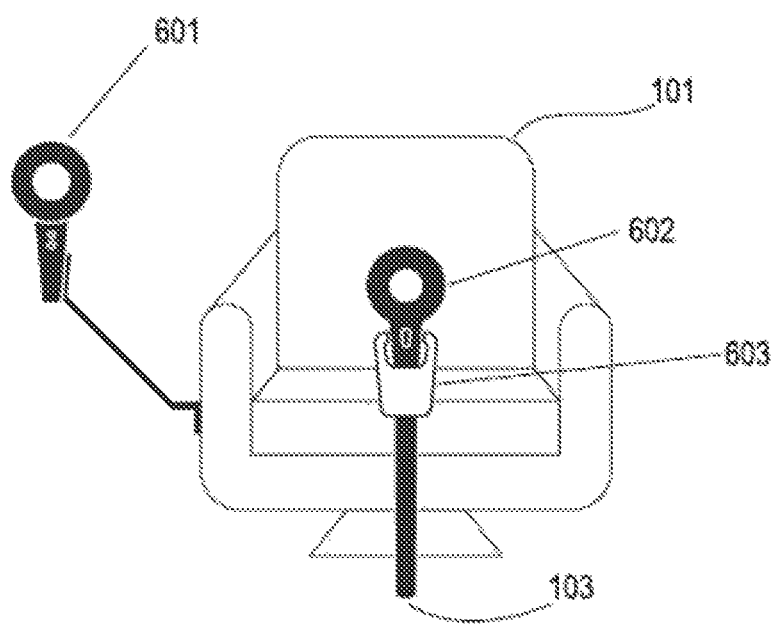
Fig. 6

VIRTUAL REALITY MOTION SIMULATOR

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects described herein generally relate to extended reality (XR) (e.g., virtual reality (VR), augmented reality (AR), mixed reality (MR)) input devices (e.g., devices comprising motion sensors, such as motion controllers) and methods for using the same. More specifically, aspects provide a biomechanical motion simulator for use in conjunction with an XR system providing an XR environment to create a more engaging and immersive user experience.

BACKGROUND

In recent years, XR systems which present XR environments to users have become increasingly popular. For example, a number of different video games have been developed which use XR systems. As another example, XR systems are used for movies, television shows, and music videos. As yet another example, XR systems may be used for industrial purposes, such as in a factory, or as part of 3D design software.

In XR environments provided by such XR systems, it may be desirable to simulate real-world movement and forces. For example, some XR systems allow users to walk around an XR environment, in effect translating real-world motion (including the feeling of walking on the ground) into motion in the XR environment. As another example, some XR systems allow a user to manipulate a real-world object (e.g., a video game controller, bicycle pedals) to effectuate motion in an XR environments. When possible, it may also be advantageous to simulate feedback from the XR environment back to a user. For example, a video game steering wheel input device may rumble when a user drives over rough terrain in a video game, thereby simulating the experience of the vehicle bouncing on the rough terrain. But simulating real world movement and/or feedback can present significant difficulties. In particular, tracking user motion can be difficult, and errors and/or inaccuracies can cause motion sickness and/or a lack of immersion on the part of a user. For example, even milliseconds of delay between real-world motion (as captured by, for example, sensors of an XR system) and corresponding motion in an XR environment may cause some users to become physically ill. Similarly, it can be very difficult to simulate certain types of real-world feedback, such as g-forces, as those types of feedback can be difficult to simulate without significantly large and complicated equipment.

Devices configured to improve and/or aid motion in an XR environment are typically cumbersome, expensive, and imprecise. Some XR systems use devices located around a room to track the real-world motion of a user in the room by tracking one or more devices attached to the user; however, such devices are typically imprecise and may not detect small motions by a user. Other XR systems use complex sensors to detect small motions by the user (e.g., by tracking the fingers of the user), but such devices are often expensive and imprecise. Still other XR systems attempt to track user movement by monitoring the user on a camera (e.g., a series of cameras at different angles); however, such motion tracking can be imprecise, invasive, and expensive.

One particular example of a limitation with devices improve and/or aid motion in an XR environment is that such devices typically require external motors and other machinery which can be cumbersome, expensive, and occasionally dangerous. For example, arcade machines implement large moving chairs to aid in the realism of driving games, but such systems can be quite costly and complex, which is why such systems are often relegated to arcades. In this manner, existing systems can be costly to acquire and maintain, such that many entertainment venues, educational institutions, and consumers are unlikely to be able to afford the space or the cost of purchasing such systems.

Similarly, devices configured to provide feedback from an XR environment to a user of an XR system are typically rudimentary, imprecise, and can be expensive. For example, various video game controllers may be configured to rumble (e.g., using a motor); however, such motors are typically limited in that they can only simulate certain types of touch feedback (e.g., simulating rumbling, shaking, or the like). As another example, some commercial XR systems use fans to simulate wind and/or breath from an XR environment; however, such fans are perhaps predictably limited to simulating the motion of air. As yet another example, large flight simulator devices can be moved using a series of motors to simulate g forces; however, such devices are extremely large, expensive, and require significant safety considerations.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to motion simulation systems to be used in conjunction with XR environments to improve user experience while in the XR environment. A method of simulating motion in an Extended Reality (XR) system is described herein. An XR environment may be displayed using a head mounted display worn by a user of the XR system. Motion input may be received from a motion sensor (e.g., as part of a motion controller) fixed in relation to a seat of a mechanical chair movable in at least two dimensions. The motion input data may comprise a first direction of tilt of the mechanical chair in at least two dimensions. Such tilt may be user-induced, such that motors or other mechanisms are not required to cause such tilt. The motion input data may additionally and/or alternatively comprise a first magnitude associated with the first direction of tilt. The motion input data may additionally and/or alternatively comprise a second magnitude associated with the first direction of tilt, wherein the second magnitude identifies an angle of rotation. The first magnitude may identify an angle of rotation. The first magnitude may identify an angular velocity. A resultant magnitude and a resultant direction to be applied within the XR environment may be determined based on the motion input data. The displayed XR environment may be updated by moving the user within the XR environment based on the resultant direction and the resultant magnitude. The resultant direction may be relatively opposite to the first direction of tilt. The at least two dimensions may comprise pitch and roll. The process may comprise receiving perspective data from the head mounted display, determining, based on the perspective data and the motion input data, a virtual reality sight field; and updating the displayed XR environment based on the virtual reality sight field. Such perspective data may be based on user input from moving the head mounted virtual reality display.

An apparatus for simulating motion in an extended reality (XR) system is also described herein. The apparatus may comprise a seat for receiving a human occupant. The apparatus may comprise a base movably connected to the seat to allow the seat to move in at least two dimensions in relation to the base. Motion of the seat may be performable in a manner such that external motors or similar mechanisms are not required. For example, motion of the seat may be induced by motion of the user. The at least two dimensions may comprise pitch and roll. The at least two dimensions may comprise turning in a clockwise or counterclockwise direction. The apparatus may comprise a control yoke fixed in relation to the base. The control yoke may be configured to not move in relation to the base when the force is exerted by the human occupant. The control yoke may comprise a second adapter for receiving a second virtual reality motion controller, such as a device comprising one or more buttons, motion sensors, or the like. The second adapter may be configured to hold the second virtual reality motion controller such that one or more inputs of the second virtual reality motion controller are accessible by the human occupant. When a force is exerted by the human occupant on the control yoke, an opposite force may be exerted on the seat such that the seat is moved in a direction substantially opposite a direction of the exerted force. The apparatus may comprise an adaptor for receiving a virtual reality motion controller, such as a device comprising one or more buttons, motion sensors, or the like. The adaptor may be attached to the apparatus such that the virtual reality motion controller moves in a fixed relationship to the seat.

A system for simulating motion in an extended reality (XR) system is also described herein. The system may comprise a passive input device. The passive input device may be configured to not move in relation to the base when force is applied to the passive input device. The system may comprise a passive motion simulator configured to receive a human occupant and configured to move in one or more directions in relation to a base based on force, applied by a user, to the passive input device. The one or more directions may comprise pitch and roll. The one or more directions may comprise turning in a clockwise or counterclockwise direction. The system may comprise a motion sensor configured to collect real world motion data associated with the passive motion simulator. The motion sensor may be attached to an arm extending from the passive motion simulator. The system may comprise an XR device configured to provide an XR environment to a user. The XR device may be configured to receive, from the motion sensor, the real world motion data. The XR device may be configured to determine, based on the real world motion data, a corresponding motion in the XR environment. The XR device may be configured to modify the XR environment based on the corresponding motion. The XR device may comprise a head-mounted XR device configured to be worn by a user.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 2-A depicts a user at rest, FIG. 2-B depicts a user leaning, and FIG. 2-C depicts a user leaning with a change in an XR environment;

FIGS. 5A-5C illustrate different depictions of a virtual reality motion simulator while in use, in accordance with one or more illustrative aspects described herein: FIG. 5A depicts a user at rest, FIG. 5B depicts a user leaning, and FIG. 5C shows a user leaning and a change in a XR environment;

FIG. 6 illustrates another biomechanical virtual reality motion simulator system, in accordance with one or more illustrative aspects described herein;

DETAILED DESCRIPTION

Figure 1:
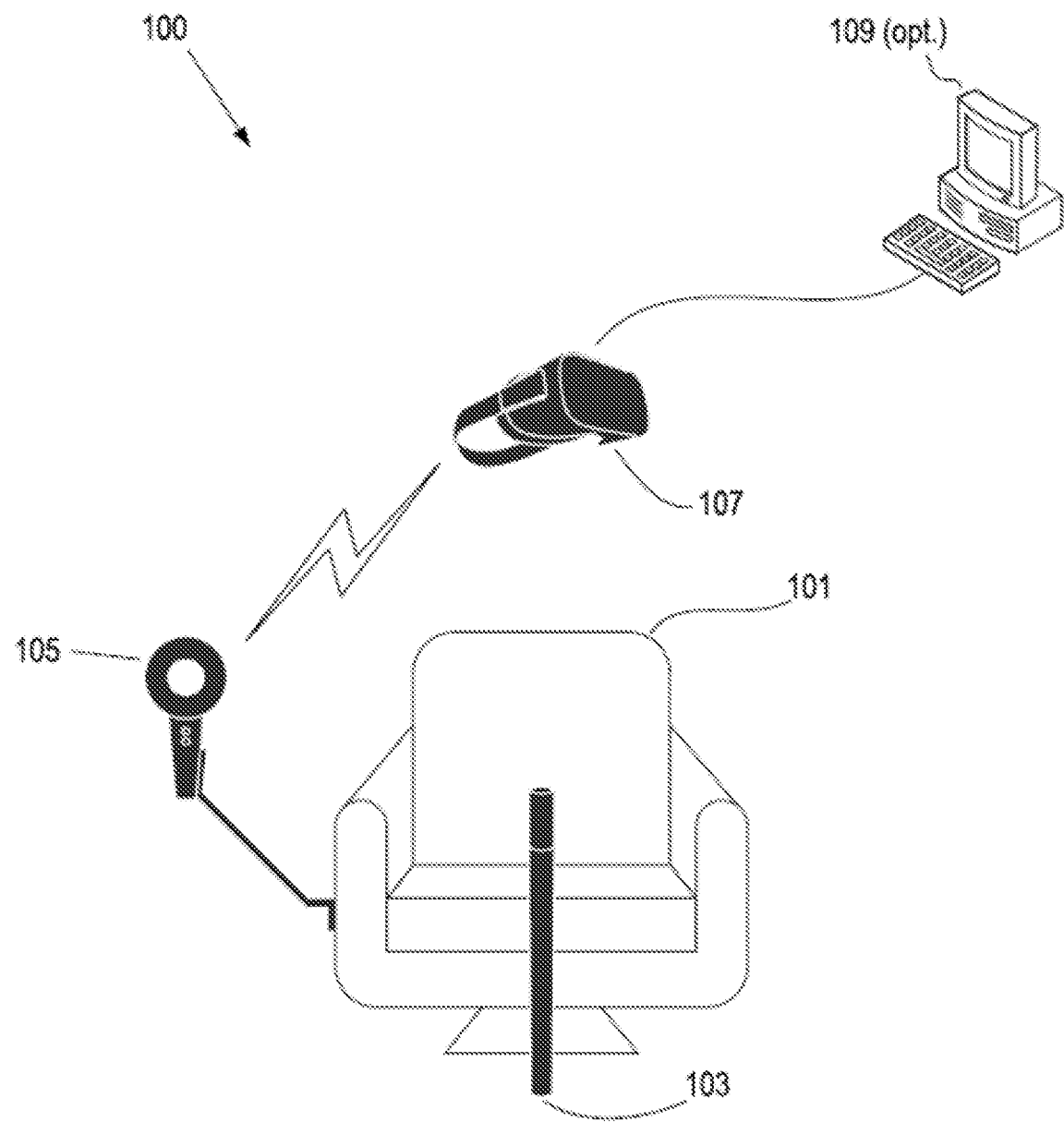
FIG. 1. illustrates a biomechanical virtual reality motion simulator system, in accordance with one or more illustrative aspects described herein.

In the following description of the various embodiments, reference is made to the accompanying drawing, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," and similar terms, is meant to include both direct and indirect mounting and connecting.

As a general introduction, aspects discussed herein relate to XR environment input. XR environments may be configured to simulate all or portions of an environment, whether or not the environment is intended to be real (e.g., a virtual version of a tourist destination) or fantastical (e.g., a fantasy castle, a virtual monster, or the like). To effectuate such a simulation, an XR environment may provide output (e.g., images, video, audio) and allow users to interact with the XR environment in one or more ways. For example, an XR environment may allow a user to, by swinging a real-world controller in their hand, swing a virtual sword. As another example, an XR environment may allow a user to turn a real-world steering wheel and cause a car in the XR environment to turn. The XR environment may also provide feedback associated with the simulation. For example, in addition to providing visual/audio feedback (e.g., via a display screen and one or more speakers), the XR environment may cause motion controllers used by a user of the XR environment to rumble. While there have been gradual improvements in devices which may be used to provide input to an XR environment and devices which provide feedback from an XR environment, these devices are still limited. For example, many high-fidelity motion trackers can be prohibitively expensive for the average user. As another example, devices which allow for the simulation of g-forces can be prohibitively large, expensive, and have serious safety implications, which is often why such devices are limited to commercial environments (e.g., in museums).

Aspects described herein improve the ability of computing devices to provide XR environments by providing a high fidelity, responsive, engaging, and affordable XR input method. By pairing a real-world device that uses gravity to provide feedback to a user of an XR environment with software that disconnects the motion of a chair with other motions of the user (e.g., the user turning their head, moving their arms, or the like), the aspects described herein significantly improve the fidelity and realism of an XR environment at a low cost. For example, the system described herein may allow a user to feel simulated g-forces when driving a vehicle in the XR environment without the need for prohibitively expensive equipment. As another example, the system described herein provides input which may be readily processed and understood by a computing device, lowering the risk of a disconnect between real-world motion and motion in the XR environment. There are numerous other benefits to such a combination, including but not limited to the ease of production and repair of such a system, the ease with which the underlying software can be improved (as the chair itself may be adapted to work with a variety of engines and in a variety of circumstances), and the like.

As used herein, an XR environment may comprise one or more of a VR, AR, or MR environment. For example, the XR environment may comprise a 3D environment, such that a user may look at the XR environment from different perspectives and/or move about the XR environment. The XR environment may be used by one or more users. In general, each user of an XR environment may use an XR device to interact with the environment; however, in some circumstances, multiple users may use the same device to access the XR environment. For example, views of the XR environment may be projected onto the walls of an empty room, such that multiple individuals in the same room may enjoy the XR environment. The XR environment may simulate one or more objects, whether intended to be real or fantastical. The XR environment may comprise a simulation of physics or other natural phenomena such that, for example, motion of objects in the XR environment may be reproduced in the XR environment.

FIG. 1 is a diagram showing an illustrative biomechanical XR simulation system 100. As will be described in more detail below, the biomechanical XR simulation system 100 may help immerse a user into an XR environment. This may permit the user to engage with the XR environment more intuitively by stimulating the user's vestibular senses when the user interacts with the XR environment. For example, by leaning a user of the biomechanical XR simulation system 100, the biomechanical XR simulation system 100 may use gravity to simulate g-forces that might occur when a user turns a virtual vehicle in an XR environment.

The biomechanical XR simulation system of FIG. 1 may comprise physical, mechanical elements, various computer hardware and peripherals, and XR simulation software. The biomechanical XR simulation system 100 may include a passive motion simulator 101 (e.g., a seating device, such as a chair, which may move in any number of directions), a passive mechanical XR simulation input device 103 (e.g., a control stick and/or a yoke), a motion sensor 105 (e.g., all or portions of an XR input controller, a game controller, or the like), a computing device 109, and an XR device 107 (which, as displayed in FIG. 1, may be head-mounted).

A user may be presented an XR environment via the XR device 107. The XR device 107 may be a head mounted display that may be capable of operating the biomechanical XR simulation system 100 without additional computing devices (e.g., without the computing device 109). For example, the XR device may comprise the VALVE INDEX VR device developed by Valve Corporation of Bellevue, Wash., the OCULUS QUEST VR device sold by Facebook Technologies, LLC of Menlo Park, Calif., and the HTC VIVE VR device sold by HTC Corporation of New Taipei City, Taiwan. The XR device 107 may contain additional motion sensors and processors for presenting an XR environment. Additionally and/or alternatively, the XR device 107 may be "tethered"; that is, it may be connected to the computing device 109, and the computing device 109 may be configured to perform the calculation steps necessary for presenting the XR environment. Additional detail regarding the XR device 107 is provided when discussing FIG. 7, below.

Via the XR device 107, a user may visually perceive the XR environment. Using the biomechanical XR simulation system 100, the user may also perceive the simulated XR environment through the user's vestibular senses, which may simulate and/or enhance motion in the XR environment for greater interaction and immersion. Motion simulation by stimulating a user's vestibular senses may be accomplished when a user exerts a force upon the input device 103 while resting on the passive motion simulator 101. The passive motion simulator 101 and/or the input device 103 may be referred to as passive in this context because they do not themselves directly communicate with XR device 107 and/or the computing device 109, but rather provide physical feedback to a user's vestibular senses. The passive motion simulator 101 and/or the input device 103 may also be referred to as passive because they do not include any motors or electronics in order to provide vestibular feedback to the user; rather, the force exerted by the user on the input device 103 may cause passive motion simulator 101 to change orientation. In this manner, though motorized assistance may be provided if desired (e.g., to make moving the passive motion simulator 101 easier), no motorized assistance is required.

In some circumstances, the XR device 107 need not be worn on a head of a user. For example, the XR device 107 may be all or portions of a large screen projected around the user (e.g., in front of the user, all around the user, etc.). In this manner, the user may be capable of looking around and experiencing an XR environment without needing to wear a potentially heavy and/or cumbersome headset. Accordingly, while examples provided herein largely illustrate a user wearing a headset-style XR device 107, the present invention is not limited to such devices, and may include any sort of devices which permit a user to visually perceive an XR environment.

The passive motion simulator 101 may be a seat or similar piece of furniture for supporting the user's body. The passive motion simulator 101 may be connected to a base such that, for example, it remains substantially on the ground and situates the passive motion simulator 101 in a comfortable position. The seat may be capable of tilting and/or turning in various directions, such as forwards and backwards (i.e., movable in pitch), side to side (i.e., movable in roll), turning from left to right, and/or up and down (i.e., along a Z-axis). It may be desirable to permit certain directions of motion (e.g., tilting forward and backward, turning clockwise or counterclockwise) but not others (e.g., tilting side to side) for the comfort of the user. The passive motion simulator 101 may be aided and/or hindered in such movement due to hinges, springs, or other movable connectors. For example, springs (e.g., made of steel, rubber, or a comparable material) may be used to soften and/or limit the range of motion of the passive motion simulator 101. The springs may also bias the seat (and the user) to a centered, upright "home" position. A user may be capable of configuring the passive motion simulator 101 to change the default "home" position of the passive motion simulator 101. For example, the user may be capable of defaulting the passive motion simulator 101 such that it is partially reclined for comfort. Other elements may be used in addition to and/or in place of hinges and/or springs. The passive motion simulator 101 may be configured to maintain an angle of tilt (e.g., without returning to center position) until a user causes the return to center using the input device 103.

The passive motion simulator 101 may include a motion sensor 105. The motion sensor may be all or portions of a conventional game controller, such as a motion controller for a virtual reality headset. The motion sensor 105 may be attached (e.g., by an arm extending from the passive motion simulator 101) and/or otherwise associated with the passive motion simulator 101 such that the motion sensor 105 is fixed in relation to a known (or calibrated) axis and/or plane (e.g., the seat) of the passive motion simulator 101. In this way, the motion sensor 105 may move with the passive motion simulator 101. For example, if the passive motion simulator 101 tilts left, the motion sensor 105 may similarly tilt left. The motion sensor 105 may comprise one or more gyroscopes and/or accelerometers and may be capable of detecting motion (e.g., angular motion, acceleration, or the like) in any manner of directions, and may detect motion having acceleration, velocity, and/or direction. The motion sensor 105 may be separate from the passive motion simulator 101 such that, for example, it may be inserted into a designated spot or holding apparatus of the passive motion simulator 101. For example, the motion sensor 105 could be a commercially sold XR controller, such as one or more of the OCULUS TOUCH device sold by Facebook Technologies, LLC of Menlo Park, Calif.

The passive XR simulation input device 103 may comprise a stick or other apparatus fixed to the base of the passive motion simulator 101. In this manner, the passive XR simulation input device may be configured to not move while the passive motion simulator 101 moves. For example, when a user exerts a force upon the input device 103 while using (e.g., sitting on) the passive motion simulator 101, the user may tilt in the direction opposite of the direction of the applied force to a degree proportionate to the magnitude of the applied force. If a user pushed to the right upon the input device 103, then the user would tilt to the left on the passive motion simulator 101, and vice versa. Likewise, if a user pushed forward upon the input device 103, then the user would tilt backwards on the passive motion simulator 101, and vice versa. The user's own physically applied force is used to move the user in a physical direction opposite the applied force.

Figure 2:
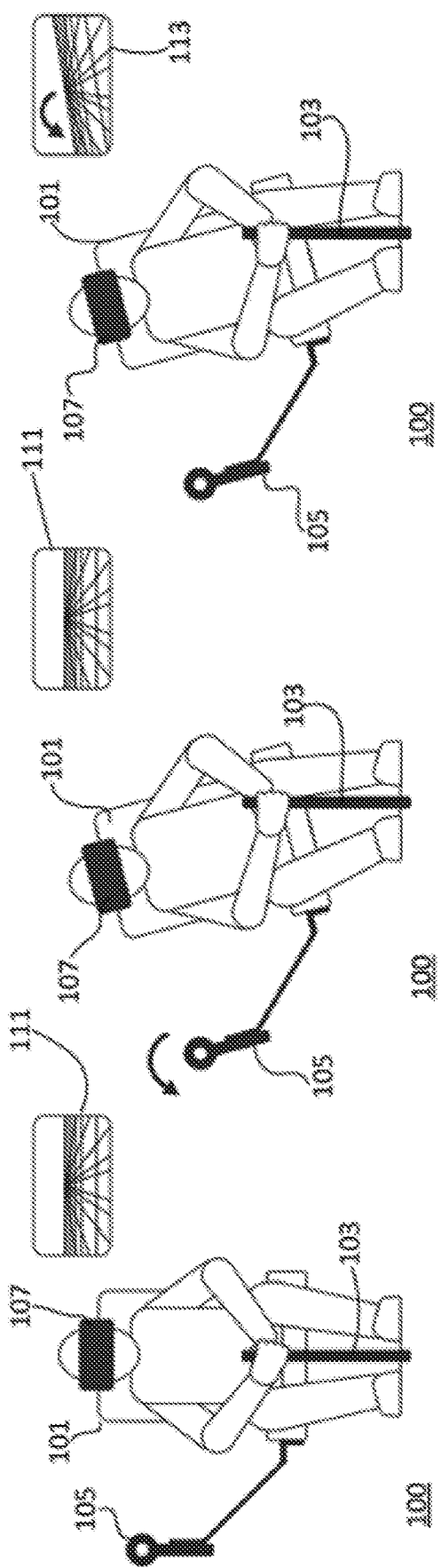
FIGS. 2-A through 2-C illustrate the biomechanical virtual reality motion simulator of FIG. 1 while in use, in accordance with one or more illustrative aspects described herein.

FIGS. 2-A through 2-C illustrate the biomechanical XR simulation system 100 when used by a user. FIG. 2-A illustrates the biomechanical XR simulation system 100 at rest. When a user applies force to the input device 103, the force may cause the passive motion simulator 101 to tilt. In this circumstance, an XR environment 111 may appear in an un-tilted state. The biomechanical XR motion simulator is shown in a tilted state in FIG. 2-B. Tilting, as shown in FIG. 2-B, may engage the user's vestibular senses because the user is now no longer oriented upright in space in relation to the Earth's gravitational force. Thus, the vestibular senses mimic a sensation of motion in the direction opposite of the tilt. For example, as discussed in more detail with respect to FIG. 5, a tilt backwards may mimic the g forces experienced during forward acceleration. As another example, a tilt to the side (as shown in FIG. 2) may mimic the g forces experiences when turning. The sensation of motion may be amplified by providing the user with an XR environment corresponding to the motion sensation. For example, an XR environment may provide a visual, such as XR environment 113 of FIG. 2-C, that shows the effects of turning.

The motion sensor 105, which may be fixed in relation to passive motion simulator 101, may detect tilt of passive motion simulator 101 (e.g., as caused by the user pushing on the input device 103. A computing device, such as a computing device that is part of the XR device 107 and/or the computing device 109, may use the speed of tilt (e.g., the angular momentum), direction of tilt, and/or degree of tilt of the passive motion simulator 101, as relayed by the motion sensor 105, to determine a direction and magnitude to apply within the XR environment 111. The computing device may then move the user through the XR environment 111 in a direction and/or at a rate based on and/or proportional to the magnitude. The XR environment may display such motion via the XR device 107. The user, as shown in FIGS. 2-A to 2-C, will feel a turning motion through 3D space when the user is actually tilted sideways and stationary in real life.

The biomechanical XR simulation system 100 may be readily suitable for creating a more intuitive and immersive XR environment for flight simulation or space flight simulation style games. With the biomechanical XR simulation system 100, a user may engage with the input device 103 just as a pilot would engage with an airplane's joystick, and the XR environment may thereby respond as a real airplane would while the system also stimulates the user's vestibular senses. Thus, a user may push forward against the passive XR simulation input device 103 as a pilot would push forward against a joystick in an airplane to place the airplane into a dive. The biomechanical XR motion simulator system may thereby stimulate the user's vestibular senses as if the user were in an actual diving plane, and the XR system may update the XR environment 111 to show the user the view from a diving airplane. Likewise, the user may pull back against the input device 103 to make the airplane climb in the XR environment, and the biomechanical XR motion simulator system may stimulate the user's vestibular senses as though the user were in a climbing plane. Similarly, the user may apply force to either side of the input device 103, and the biomechanical XR motion simulator system may simulate an airplane in roll.

The biomechanical XR simulation system 100 may also be used in racing games. For example, the input device 103 may comprise a mock automobile wheel, a pulley system, and/or similar devices. In such an example, the input device 103 may be configured such that, for example, when the user turns a steering wheel, the user also tilts the passive motion simulator. To accomplish such tilting, turning the wheel may cause a chain to turn a rod under the passive motion simulator, thereby tilting it left and/or right. In this manner, a user's vestibular senses may be stimulated in racing games to correspond to turning left or right in a vehicle. This may serve to increase the user's immersion into the XR environment.

The biomechanical XR simulation system 100 may also include a block fixed to the base of the biomechanical XR simulation system 100 as another passive XR simulation input device. The user may push against this fixed block as a driver would push against an accelerator pedal in an automobile. The user's force may push the user backwards, causing the passive motion simulator to tilt backwards, thereby stimulating the user's vestibular senses to simulate forward acceleration.

Figure 3:
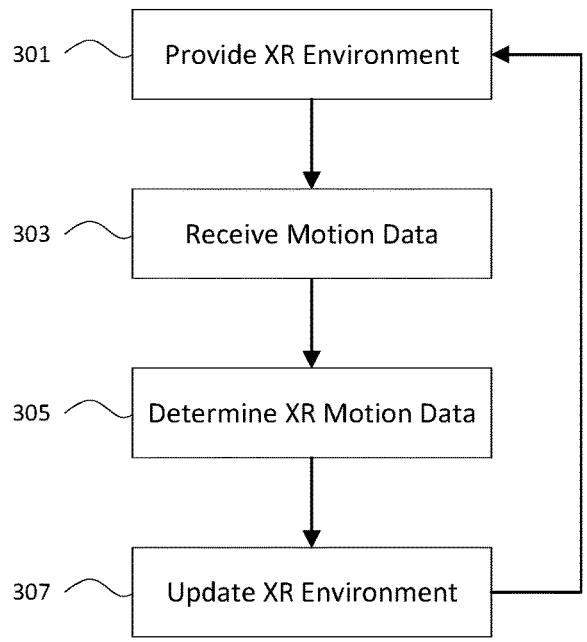
FIG. 3 illustrates a flowchart of how a virtual reality system updates a 3D environment through motion input data within the biomechanical virtual reality motion simulator system of FIG. 1, in accordance with one or more illustrative aspects described herein.

FIG. 3 illustrates a flowchart of how an XR system may update an XR environment based on movement of all or portions of the biomechanical XR simulation system 100. FIG. 3 may comprise all or portions of an algorithm. The steps of FIG. 3 may be performed by a computing device. For example, a computing device may comprise one or more processors and memory storing instructions that, when executed by the one or more processors, cause the performance of all or portions of FIG. 3. In step 301, an XR environment may be displayed. For example, the XR environment may be displayed by the XR device 107. In step 303, motion data from the motion sensor 105 (e.g., as attached to the input device 103) may be received. For example, a user may lean in the biomechanical XR simulation system 100, causing the motion sensor 105 to lean. In step 305, XR motion data corresponding to the motion data may be determined. In this manner, real-world movement (e.g., a tilt) may be translated into corresponding motion in the XR environment. In step 307, the XR environment may be updated based on the XR motion data. For example, based on a real-world tilt of a user, the XR environment may cause a virtual car to turn.

A user may freely look around the XR environment whether or not motion is detected in the biomechanical XR simulation system 100. For example, even if the user is not tilting, leaning, or turning in a manner that may be detected by the motion sensor 105, the user may move their head around, moving the XR device 107 and thereby causing a display and/or perspective of the XR environment to change. For instance, where the XR device 107 is a head mounted unit with onboard motion sensors of its own, like the OCULUS QUEST VR device sold by Facebook Technologies, LLC of Menlo Park, Calif., the user may be capable of moving their head to look around an XR environment even if the user is not moving other parts of their body. Further, while the user is tilting, leaning or turning, the user's head may still freely move around relative to the motion of their body in the XR environment. This is unique from some other XR motion platforms wherein head motion is detected by the system and translated to motion of the user's body in the XR environment.

Motion data from the motion sensor 105 (e.g., as attached to the passive motion simulator 101) may be compared to second motion data (e.g., from the XR device 107). Based on such a comparison, a determination may be made as to whether to present an XR environment that simulates motion. Additionally and/or alternatively, based on such a comparison, a determination may be made as to whether to change a view of the XR environment. In this manner, the XR environment may change based on how the user moves their head, their body, or a combination thereof. In this manner, in the context of a flight simulator, a space flight simulator, a racing simulator, or the like, a user may be able to look around the XR environment (e.g., using their head and by moving the XR device 107) such that the XR system updates the XR environment to show the user that they are looking around their virtual craft, all while maintaining directional control based on input received from the motion sensor 105. For instance, a user driving a virtual vehicle in an XR environment may be capable of looking out of a side window without turning the virtual vehicle.

Figure 4:
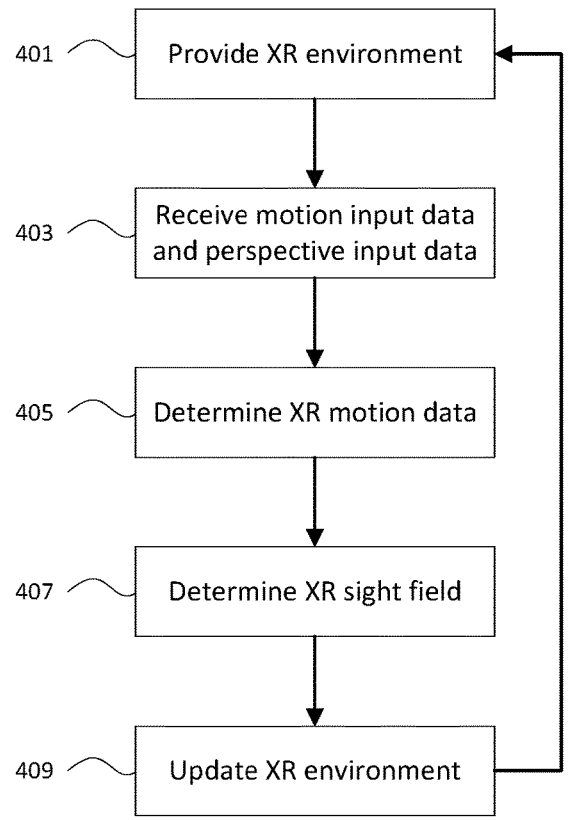
FIG. 4 illustrates a flowchart of how the virtual reality system updates a 3D environment through a combination of motion input data and perspective input data, in accordance with one or more illustrative aspects described herein.

FIG. 4 illustrates a flowchart depicting steps for updating an XR environment. Like FIG. 3, FIG. 4 may comprise all or portion of an algorithm. The steps of FIG. 4 may be performed by a computing device, whether internal or external to the XR device 107. For example, a computing device may comprise one or more processors and memory storing instructions that, when executed by the one or more processors, cause the performance of all or portions of FIG. 4. In step 401, an XR environment may be presented to a user. Step 401 may be the same or similar as step 301 of FIG. 3. In step 403, motion data may be received from the motion sensor 105 (e.g., as attached to the passive motion simulator 101). Also, in step 403, perspective data may be received from other sensors, such as sensors in the XR device 107. While the motion data may correspond to motion of the user (e.g., tilting and/or moving all or portions of the biomechanical XR simulation system 100), the perspective data may correspond to movement changes which may affect a user's perspective of the XR environment (e.g., moving their head and thereby moving the XR device 107). All or portions of step 403 may be the same or similar as step 303 of FIG. 3. In steps 405 and 407, using both the motion data and the perspective data, XR motion data and an XR sight field may be determined. The XR motion data may be based on the motion data such that, for example, it translates real-world motion into motion in the XR environment. The XR sight field may be based on the perspective data such that, for example, it translates a real-world change in perspective into an XR environment change in perspective. In step 409, the XR environment may be updated based on the XR motion data and/or the XR sight field.

FIG. 5 depicts how the biomechanical XR simulation system 100 may be used with respect to an XR environment that simulates flying a plane. In XR environments such as that depicted in FIG. 5, a virtual vehicle may represent a user's location and rotational orientation in 3D space in the virtual environment. By moving the virtual vehicle in an opposite motion of the user's real-world motion, the XR software may thereby induce the user to feel the positional force that would be felt by the user in the real world. Such a feeling may be, in part, due to the XR environment displaying motion in the opposite direction of the motion felt by the user. As a simplistic example, and as discussed more below, showing a vehicle accelerating forward while the user leans back may induce the user to feel as if they are accelerating forward. For example, with reference to the biomechanical XR simulation system 100, the XR software may use the input from the motion sensor 105 to move a virtual vehicle displayed in an XR environment, and then update the user's display perspective accordingly.

As shown in FIG. 5, in phase A, a user is sitting in the passive motion simulator 101 (in this context, shown as a chair), piloting aircraft 501 in a simulated virtual environment viewed through XR device 107. In phase A, the aircraft 501 is in stable flight; that is, the aircraft 501 is shown in FIG. 5 as moving in a straight and constant direction and speed/velocity. In phase B, the user sitting in the passive motion simulator 101 is shown exerting forward force against the input device 103, resulting in the passive motion simulator 101 (and the user seated in it) tilting backward responsive to the force exerted forward. In such a circumstance, the motion sensor 105, shown in FIG. 5 as mounted to the passive motion simulator 101, may input to an XR system (e.g., the XR device 107 and/or the computing device 109) indicating that the user has tilted backward. In phase C, the XR device 107 and/or the computing device 109 may modify the XR environment based on the motion of the passive motion simulator 101 (as detected, e.g., by the motion sensor 105), resulting in the aircraft 501 accelerating forward in the XR environment. Additionally and/or alternatively, the aircraft 501 may move forward and/or down. The user pitching backwards in the passive motion simulator 101 mimics similar forces and pressures on the user's vestibular senses as the as if the aircraft 501 were accelerating in real life. In this manner, the user is given a more realistic sense of motion in the virtual environment, regardless of the fact that the user remains in the same location (except for pitch, roll, and/or yaw).

The steps performed in FIG. 5 may be performed by the XR device 107 and/or the computing device 109. For example, the XR device 107 and/or the computing device 109 may be configured with specific software, algorithms, or the like which are configured to modify an XR environment based on the motion of the passive motion simulator 101. An illustrative set of steps for such a process is discussed above with reference to FIG. 4.

FIG. 6 illustrates the biomechanical XR simulation system 100 using two input controllers. The system depicted in FIG. 6 may be similar to the system in FIG. 1, except that the system may use two XR motion sensors (a first motion sensor 601 and a second motion sensor 602) instead of the motion sensor 105 shown in FIG. 1. In FIG. 6, the first motion sensor 601 may be mounted in a fixed relationship to passive motion simulator 101 in a manner similar to how the motion sensor 105 is shown mounted to the passive motion simulator 101 in FIG. 1. The second motion sensor 602 may be mounted on the input device 103, either directly or using an adapter 603. Different adapters might be used for different VR input controller types. For example, a first adapter might be configured to receive a controller configured for use with the OCULUS TOUCH device sold by Facebook Technologies, LLC of Menlo Park, Calif. As another example, a second adapter might be configured to receive a controller configured for use with the HTC VIVE VR device sold by HTC Corporation of New Taipei City, Taiwan. Other adapters may be configured to receive other input devices, whether motion sensors such as the first motion sensor 601 and the second motion sensor 602 or otherwise. The adapter 603 may be fixed to control the input device 103 to provide stability and support for the second motion sensor 602, such that the user can provide additional input via the second motion sensor 602 while engaging in an XR simulation. For example, a user might use one or more inputs of the second motion sensor 602 to fire a weapon in the simulation. As another example, inputs of the second motion sensor 602 may be used for weapon selection, microphone activation (simulated in game or real communication/chat with other users), target selection, and/or any other in-game or in-simulation action as desired.

The adapter 603 may be constructed of material strong enough such that it provides leverage and will not break or pop off during manipulation by the user. The adapter 603 may comprise a metal (e.g., steel or aluminum) structure (e.g., metal supports) to add strength and/or durability. The adapter 603 may be configured with a slot to receive a controller (such as the second motion sensor 602). The slot may substantially encase such a controller while exposing one or more control inputs (e.g., buttons, pads, sticks, triggers, switches, etc.) on the controller for user manipulation. The adapter 602 may thus be configured so that leverage/force exerted by the user to move the passive motion simulator 101 is primarily (or even only) exerted on adapter 603 and not on controller 602, thereby protecting controller 602 while allowing user input via controller 602.

Figure 7:
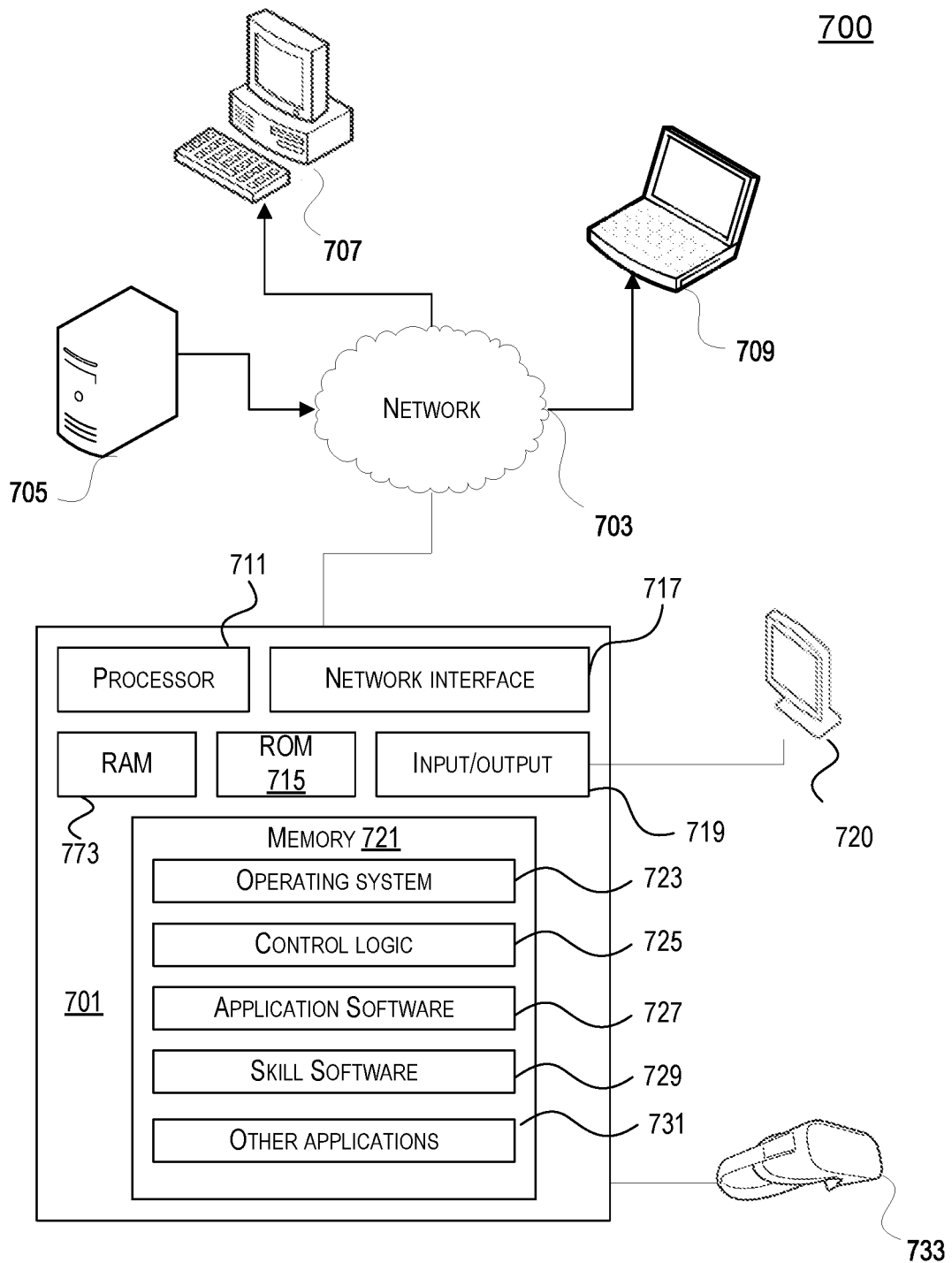
FIG. 7 depicts an illustrative computing device that may be used to implement one or more illustrative aspects discussed herein.

Discussion will now turn to hardware, such as computing devices, which may provide XR environments as discussed herein. Computer software, hardware, and networks may be utilized in a variety of different system environments, including standalone, networked, remote-access (also known as remote desktop), virtualized, and/or cloud-based environments, among others. FIG. 7 illustrates one example of a system architecture and data processing device that may be used to implement one or more illustrative aspects described herein in a standalone and/or networked environment. Various network nodes 703, 705, 707, and 709 may be interconnected via a wide area network (WAN) 701, such as the Internet. Other networks may also or alternatively be used, including private intranets, corporate networks, local area networks (LAN), metropolitan area networks (MAN), wireless networks, personal networks (PAN), and the like. Network 701 is for illustration purposes and may be replaced with fewer or additional computer networks. A local area network 733 may have one or more of any known LAN topology and may use one or more of a variety of different protocols, such as Ethernet. Devices 703, 705, 707, and 709 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 703, web server 705, and client computers 707, 709. Data server 703 provides overall access, control and administration of databases and control software for performing one or more illustrative aspects describe herein. Data server 703 may be connected to web server 705 through which users interact with and obtain data as requested. Alternatively, data server 703 may act as a web server itself and be directly connected to the Internet. Data server 703 may be connected to web server 705 through the local area network 733, the wide area network 701 (e.g., the Internet), via direct or indirect connection, or via some other network. Users may interact with the data server 703 using remote computers 707, 709, e.g., using a web browser to connect to the data server 703 via one or more externally exposed web sites hosted by web server 705. Client computers 707, 709 may be used in concert with data server 703 to access data stored therein, or may be used for other purposes. For example, from client device 707 a user may access web server 705 using an Internet browser, as is known in the art, or by executing a software application that communicates with web server 705 and/or data server 703 over a computer network (such as the Internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by web server 705 and data server 703 may be combined on a single server.

Each component 703, 705, 707, 709 may be any type of known computer, server, or data processing device. Data server 703, e.g., may include a processor 711 controlling overall operation of the data server 703. Data server 703 may further include random access memory (RAM) 713, read only memory (ROM) 715, network interface 717, input/output interfaces 719 (e.g., keyboard, mouse, display, printer, etc.), and memory 721. Input/output (I/O) 719 may include a variety of interface units and drives for reading, writing, displaying, and/or printing data or files. Memory 721 may further store operating system software 723 for controlling overall operation of the data processing device 703, control logic 725 for instructing data server 703 to perform aspects described herein, and other application software 727 providing secondary, support, and/or other functionality which may or might not be used in conjunction with aspects described herein. The control logic 725 may also be referred to herein as the data server software 725. Functionality of the data server software 725 may refer to operations or decisions made automatically based on rules coded into the control logic 725, made manually by a user providing input into the system, and/or a combination of automatic processing based on user input (e.g., queries, data updates, etc.).

Memory 721 may also store data used in performance of one or more aspects described herein, including a first database 729 and a second database 731. In some embodiments, the first database 729 may include the second database 731 (e.g., as a separate table, report, etc.). That is, the information can be stored in a single database, or separated into different logical, virtual, or physical databases, depending on system design. Devices 705, 707, and 709 may have similar or different architecture as described with respect to device 703. Those of skill in the art will appreciate that the functionality of data processing device 703 (or device 705, 707, or 709) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, DVD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 8:
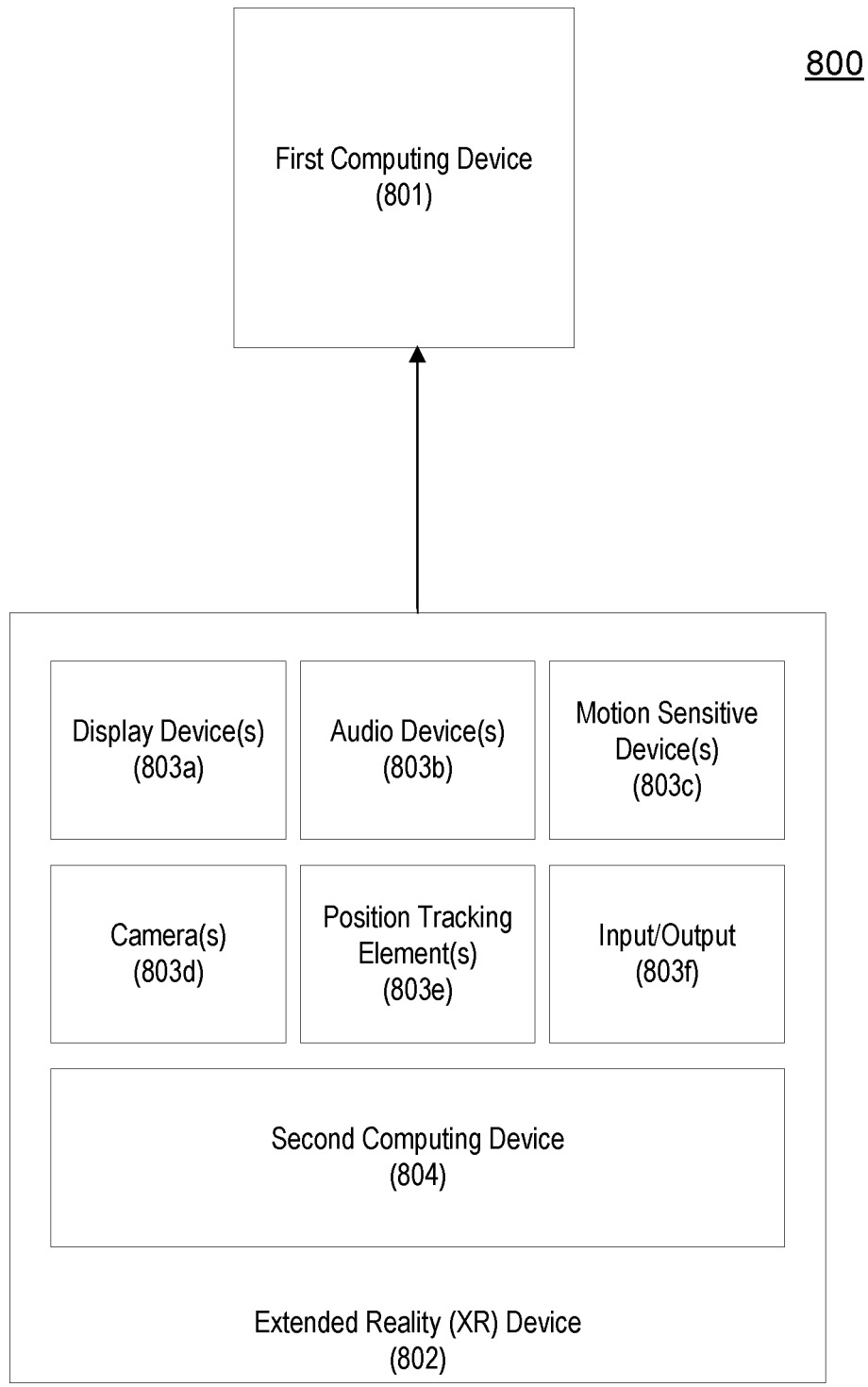
FIG. 8 depicts an illustrative extended reality (XR) device.

FIG. 8 depicts an example of an XR device 802. The XR device 802 may be the same or similar as the XR device 107. The XR device 802 may be configured to provide an XR environment (e.g., a VR, AR, and/or MR environment). The XR device 802 may be communicatively connected to a first computing device 801, which may be the same or similar as any of the components 703, 705, 707, 709 and/or the computing device 109. The XR device 802 may comprise a plurality of different elements, such as display devices 803a, audio devices 803b, motion sensitive devices 803c, cameras 803d, position tracking elements 803e, and input/output 803f. Such elements may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 802 may further comprise a second computing device 804, which may be the same or similar as any of the components 703, 705, 707, 709. Not all elements shown in FIG. 8 need to be present for operation of the XR device 802. For example, the XR device 802 might not have the cameras 803d. As another example, the XR device 802 might lack a second computing device 804, such that the first computing device 801 directly interfaces with the display devices 803a, the audio devices 803b, the motion sensitive devices 803c, the cameras 803d, the position tracking elements 803e, and/or the input/output 803f to provide an XR environment. As yet another example, the second computing device 804 may be sufficiently powerful enough such that the first computing device 801 may be omitted.

The first computing device 801 and/or the second computing device 804 need not have any particular processing power or functionality to provide an XR environment. The first computing device 801 and/or the second computing device 804 may comprise, for example, relatively underpowered processors which provide rudimentary video and/or audio. The first computing device 801 and/or the second computing device 804 may, for example, comprise relatively powerful processors which provide highly realistic video and/or audio.

Though described in many instances with respect to visually-based XR environments, the XR device 802 may provide audio-based XR environments. The XR device 802 need not have any of the display devices 803*a*, and may instead provide audio, touch, and/or scent-based environment(s). For example, the XR device 802 may provide an audio scenario in an XR environment which allows a user of the XR device 802 to practice conversation skills. As another example, the XR device 802 may provide a touch-based scenario which allows a user of the XR device 802 to practice being comfortable with unexpected touch sensations.

The XR device 802 may provide a VR, AR, and/or MR environment to the user. In general, VR environments provide an entirely virtual world, whereas AR and/or MR environments mix elements in the real world and the virtual world. The XR device 802 may be a device specifically configured to provide an XR environment (e.g., a VR headset), or may be a combination of devices (e.g., a smartphone inserted into a headset) which, when operated in a particular manner, provides an XR environment. The XR device 802 may be said to be untethered at least in part because it may lack a physical connection to another device (and, e.g., may be battery powered). If the XR device 802 is connected to another device (e.g., the first computing device 801, a power source, or the like), it may be said to be tethered. Examples of the XR device 802 may include the VALVE INDEX VR device developed by Valve Corporation of Bellevue, Wash., the OCULUS QUEST VR device sold by Facebook Technologies, LLC of Menlo Park, Calif., and the HTC VIVE VR device sold by HTC Corporation of New Taipei City, Taiwan. Examples of the XR device 802 may also include smartphones which may be placed into a headset for VR purposes, such as the GEAR VR product sold by Samsung Group of Seoul, South Korea. Examples of the XR device 802 may also include the AR headsets sold by Magic Leap, Inc. of Plantation, Fla., the HOLOLENS MR headsets sold by Microsoft Corporation of Redmond, Wash., and NREAL LIGHT headsets sold by Hangzhou Tairuo Technology Co., Ltd. of Beijing, China, among others. Examples of the XR device 802 may also include audio-based devices, such as the ECHO FRAMES sold by Amazon, Inc. of Seattle, Wash. All such VR devices may have different specifications. For example, some VR devices may have cameras, whereas others might not. These are merely examples, and other AR/VR systems might also or alternatively be used.

The first computing device 801 may provide all or portions of an XR environment to the XR device 802, e.g., as used by a tethered OCULUS RIFT. For example, the first computing device 801 may provide a video data stream to the XR device 802 that, when displayed by the XR device 802 (e.g., through the display devices 803*a*), shows a virtual world. Such a configuration may be advantageous where the XR device 802 (e.g., the second computing device 804 that is part of the XR device 802) is not powerful enough to display a full XR environment. The first computing device 801 need not be present for the XR device 802 to provide an XR environment. For example, where the second computing device 804 is sufficiently powerful, the first computing device 801 may be omitted, e.g., an untethered OCULUS QUEST.

The display devices 803*a* may be any devices configured to display all or portions of an XR environment. Such display devices 803*a* may comprise, for example, flat panel displays, such as one or more liquid-crystal display (LCD) panels. The display devices 803*a* may be the same or similar as the display 706. The display devices 803*a* may be singular or plural, and may be configured to display different images to different eyes of a user. For example, the display devices 803*a* may comprise one or more display devices coupled with lenses (e.g., Fresnel lenses) which separate all or portions of the displays for viewing by different eyes of a user.

The audio devices 803*b* may be any devices which may receive and/or output audio associated with an XR environment. For example, the audio devices 803*b* may comprise speakers which direct audio towards the ears of a user. As another example, the audio devices 803*b* may comprise one or more microphones which receive voice input from a user. The audio devices 803*b* may be used to provide an audio-based XR environment to a user of the XR device 802.

The motion sensitive devices 803*c* may be any elements which receive input related to the motion of a user of the XR device 802. For example, the motion sensitive devices 803*c* may comprise one or more accelerometers which may determine when a user of the XR device 802 is moving (e.g., leaning, moving forward, moving backwards, turning, or the like). Three dimensional accelerometers and/or gyroscopes may be used to determine full motion of the XR device 802. Optional external facing cameras 803*d* may be used for 3D orientation as well. The motion sensitive devices 803*c* may permit the XR device 802 to present an XR environment which changes based on the motion of a user. Any of the motion sensitive devices 803*c* may be used to determine motion of the passive motion simulator 101.

The cameras 803*d* may be used to aid in the safety of the user as well as the presentation of an XR environment. The cameras 803*d* may be used to monitor the surroundings of a user so as to avoid the user inadvertently contacting elements (e.g., walls) in the real world. The cameras 803*d* may additionally and/or alternatively monitor the user (e.g., the eyes of the user, the focus of the user's eyes, the pupil dilation of the user, or the like) to determine which elements of an XR environment to render, the movement of the user in such an environment, or the like. The cameras 803 may additionally and/or alternatively be used to determine motion of the passive motion simulator 101.

The position tracking elements 803*e* may be any elements configured to aid in the tracking of the position and/or movement of the XR device 802. The position tracking elements 803*e* may be all or portions of a system of infrared emitters which, when monitored by a sensor, indicate the position of the XR device 802 (e.g., the position of the XR device 802 in a room). The position tracking elements 803*e* may be configured to permit "inside-out" tracking, where the XR device 802 tracks the position of one or more elements (e.g., the XR device 802 itself, a user's hands, external controllers, or the like) or "outside-in" tracking, where external devices aid in tracking the position of the one or more elements.

The input/output 803*f* may be configured to receive and transmit data associated with an XR environment. For example, the input/output 803*f* may be configured to communicate data associated with movement of a user to the first computing device 801. As another example, the input/output 803*f* may be configured to receive information associated with other users of a massively multiplayer XR environment.

The second computing device 804 may be configured to provide, via the display devices 803*a*, the audio devices 803*b*, the motion sensitive devices 803*c*, the cameras 803*d*, the position tracking elements 803*e*, and/or the input/output 803*f*, the XR environment. The second computing device

804 may comprise one or more processors (e.g., a graphics processor), storage (e.g., that stores XR programs), or the like. In general, the second computing device 804 may be powerful enough to provide the XR environment without using the first computing device 801, such that the first computing device 801 need not be required and need not be connected to the XR device 802. In other configurations, the second computing device 804 and the first computing device 801 may work in tandem to provide the XR environment. In other configurations, the XR device 802 might not have the second computing device 804, such that the first computing device 801 interfaces with the display devices 803*a*, the audio devices 803*b*, the motion sensitive devices 803*c*, the cameras 803*d*, the position tracking elements 803*e*, and/or the input/output 803*f* directly.

The above-identified elements of the XR device 802 are merely examples. The XR device 802 may have more or similar elements. For example, the XR device 802 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. An apparatus for simulating motion in an extended reality (XR) system, the apparatus comprising:
   a seat for receiving a human occupant;
   a base movably connected to the seat to allow the seat to move in at least two dimensions in relation to the base;
   a control yoke fixed in relation to the base, wherein, when a force is exerted by the human occupant on the control yoke, an opposite force is exerted on the seat such that the seat is moved in a direction substantially opposite a direction of the exerted force; and
   an adaptor for receiving a motion controller, wherein the adaptor is attached to the apparatus such that the motion controller moves in a fixed relationship to the seat.

2. The apparatus of claim 1, wherein the at least two dimensions comprise pitch and roll.

3. The apparatus of claim 1, wherein the control yoke comprises a second adapter for receiving a second motion controller.

4. The apparatus of claim 3, wherein the second adapter is configured to hold the second motion controller such that one or more inputs of the second motion controller are accessible by the human occupant.

5. The apparatus of claim 1, wherein the at least two dimensions comprise turning in a clockwise or counter-clockwise direction.

6. The apparatus of claim 1, wherein the control yoke is configured to not move in relation to the base when the force is exerted by the human occupant.

* * * * *